United States Patent [19]

Greer

[11] 4,180,117
[45] Dec. 25, 1979

[54] WINDOW AWNING

[75] Inventor: Bradley G. Greer, Long Beach, Calif.

[73] Assignee: A & E Plastik Pak Co., Inc., Industry, Calif.

[21] Appl. No.: 912,190

[22] Filed: Jun. 5, 1978

[51] Int. Cl.² .............................................. E04F 10/06
[52] U.S. Cl. ......................................... 160/67; 160/72
[58] Field of Search .................... 160/59, 60, 65-69, 160/71, 72, 79, 75, 77, 81, 82; 135/5 AT

[56] References Cited

U.S. PATENT DOCUMENTS

| | | | |
|---|---|---|---|
| 886,256 | 4/1908 | Schwemer et al. | 160/72 |
| 1,228,668 | 6/1917 | Hanauer | 160/65 |
| 2,511,294 | 6/1950 | Peterson | 160/65 |
| 3,324,869 | 6/1967 | Duda | 135/5 AT |
| 3,789,903 | 2/1974 | Clark et al. | 160/75 |
| 3,955,611 | 5/1976 | Coles et al. | 160/67 |

Primary Examiner—Peter M. Caun
Attorney, Agent, or Firm—Ellsworth R. Roston

[57] ABSTRACT

A window awning, including a roll-up mechanism including a roller tube and with one end of an awning fabric attached to the roller tube and then wound around the tube and with the roll-up mechanism providing tension in the awning fabric as the fabric is unrolled from the roller tube, means for attaching the other end of the awning fabric above the window, support arm assemblies extending from either side of the window and each assembly coupled to opposite ends of the roll-up mechanism, each assembly including a main support arm extending at one end from and rotating about an attachment point to the side of the window and coupled at the other end to one end of the roll-up mechanism, a rafter arm extending at one end from and rotating about an attachment point to the side of the window and coupled at the other end to the main support arm at a plurality of positions for providing different awning positions, and means for locking the other end of the rafter arm to the main support arm at any one of the different awning positions.

19 Claims, 8 Drawing Figures

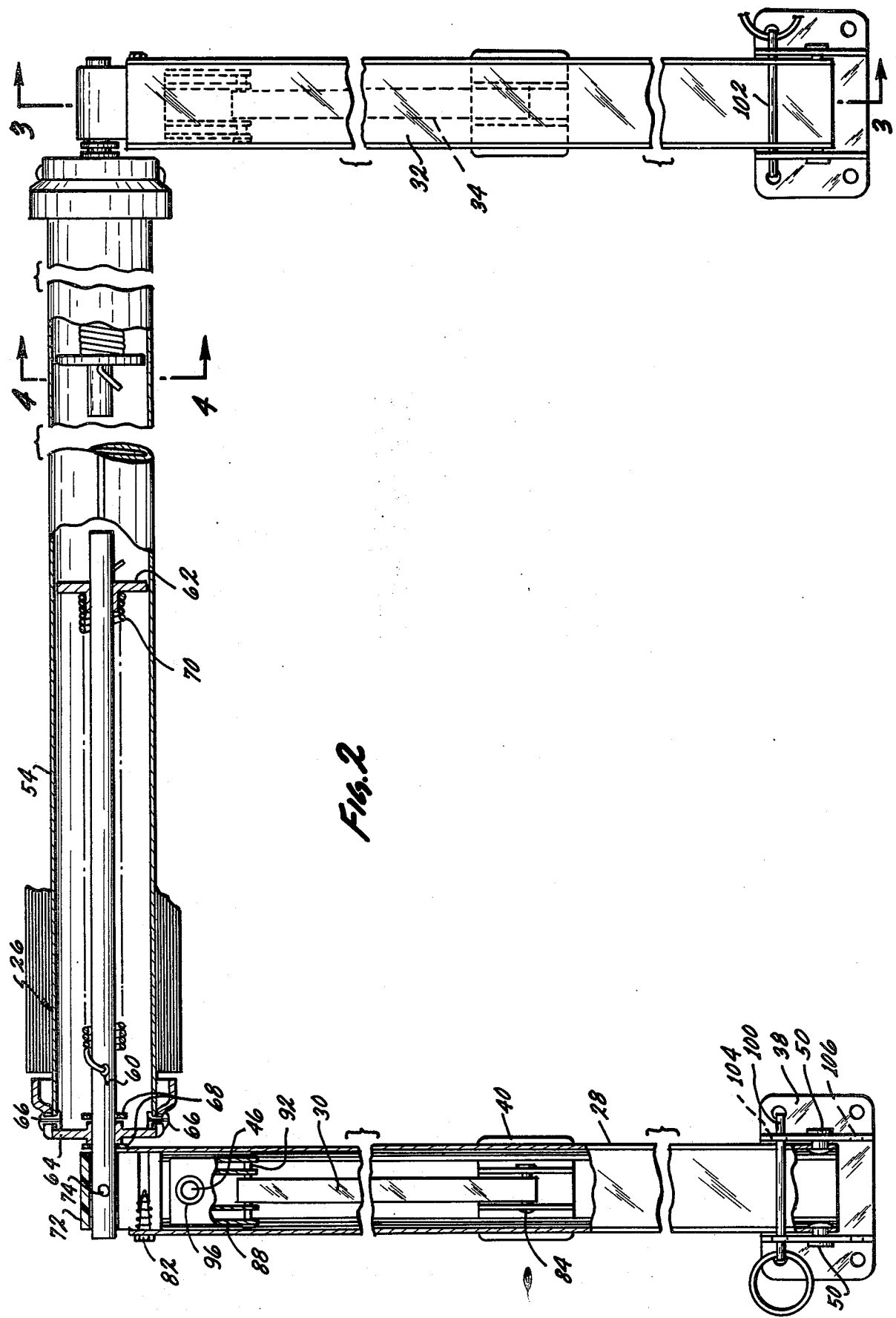

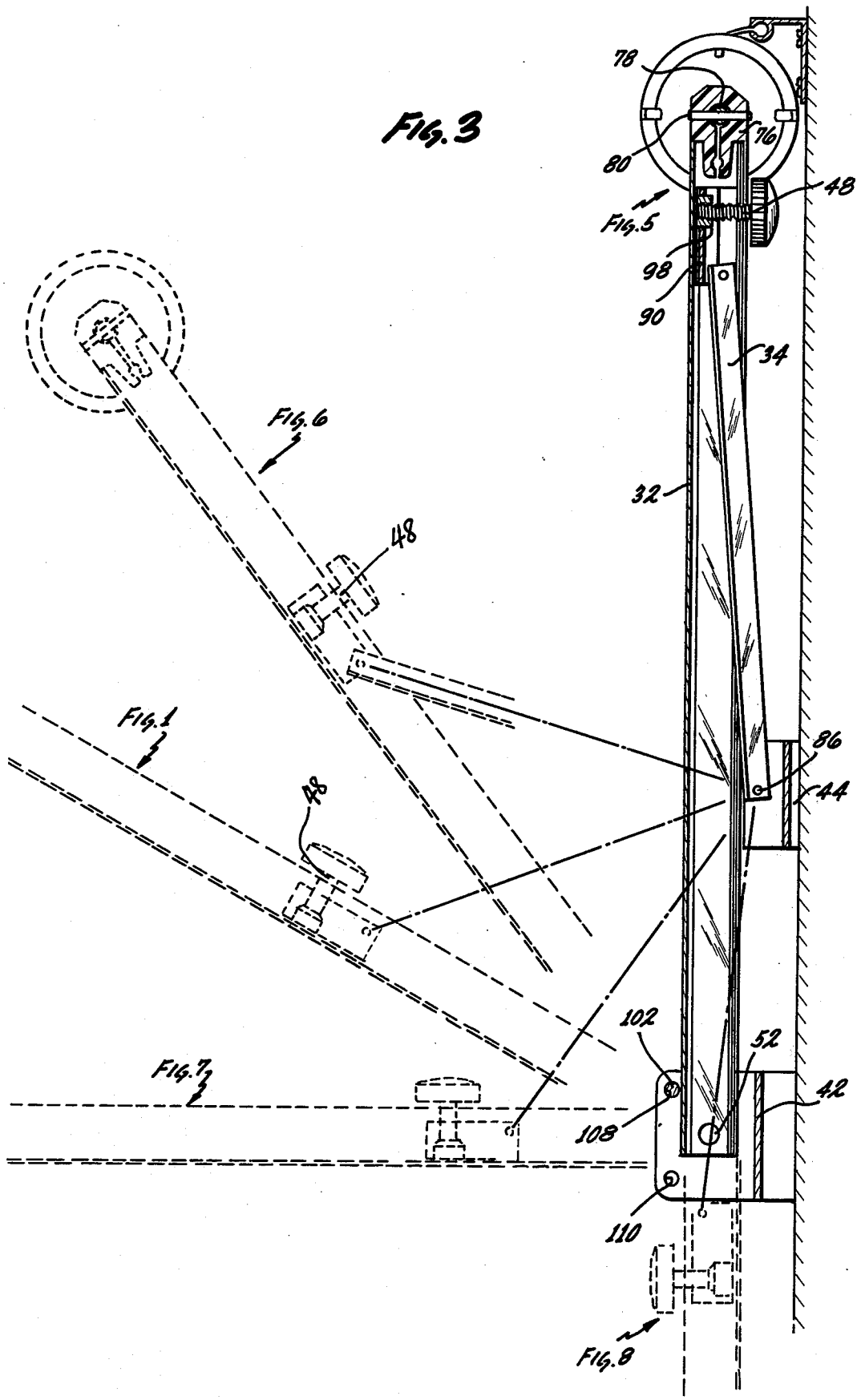

WINDOW AWNING

The present invention is directed to a window awning and specifically to a retractable window awning for use with a recreational vehicle.

It is often desirable to use a retractable window awning with a recreational vehicle. With this type of awning and when the vehicle is parked, the awning may be pulled out to a position so as to exclude sun and thereby help keep the vehicle cooler. When the vehicle is moving, the awning is retracted to a fully closed position so as to lie flat against the side of the vehicle during travel.

The present invention provides for a window awning with the above features and, in addition, is constructed so as to allow for an infinite number of awning positions from a fully closed or retracted position to a fully opened position where the awning fabric actually lies flat across the window. This fully opened position is referred to as a storm position and provides for complete privacy within the vehicle and also provides for maximum protection in severe weather conditions. The storm position may also be used to help keep the recreational vehicle warmer on cold nights since, in the storm position, the awning fabric provides for an additional layer of insulation covering the window.

The window awning of the present invention provides for the above described features through the use of a unique support arm assembly. Specifically, the window awning of the present invention has a support arm assembly which includes an extra supporting rafter arm and with the end of the supporting rafter arm slidably and rotatably coupled within the main support arm to provide for an infinite number of coupled positions for the arm assembly and thereby the window awning. In addition, the extra rafter arm provides for a more solid mounting of the window awning since the window awning is installed with a support arm assembly on each side of the awning and with each assembly mounted at two points to provide for a four point mounting for the window awning. The use of this type of mounting makes it much less likely that the awning will pull away from the side of the vehicle.

As described above, the ends of the rafter arms slide within the main support arms, and additionally include lock knobs so as to secure the arms and thereby secure the window awning in any desired position. In addition to securing the window awning in position using the lock knobs, the window awning of the present invention also includes safety lock pins. These safety lock pins provide an additional measure of safety and in particular provide for locking of the support arm assemblies when the window awning is in the closed position or the storm position.

The window awning of the present invention is normally constructed using a heavy laminated vinyl fabric for the awning and including an integral heavy duty weather shield. The awning also includes a valance which gives additional shade and also gives the awning a more finished look when the awning is positioned in the normal position for the awning. The support arms of the window awning are made of extruded metal such as extruded aluminum which again provides for a very strong and secure structure for the window awning of the present invention.

A clearer understanding of the invention will be had with reference to the following description and drawings wherein FIG. 1 illustrates a perspective view of the window awning of the present invention in the normal position;

FIG. 2 illustrates a front view of the left side portion of the window awning without the fabric and partially broken away to show the structure of the support arm and the roll-up mechanism;

FIG. 3 is a cross-sectional view of the right support arm structure for the window awning of the present invention taken along lines 3—3 of FIG. 5;

Figure 1:
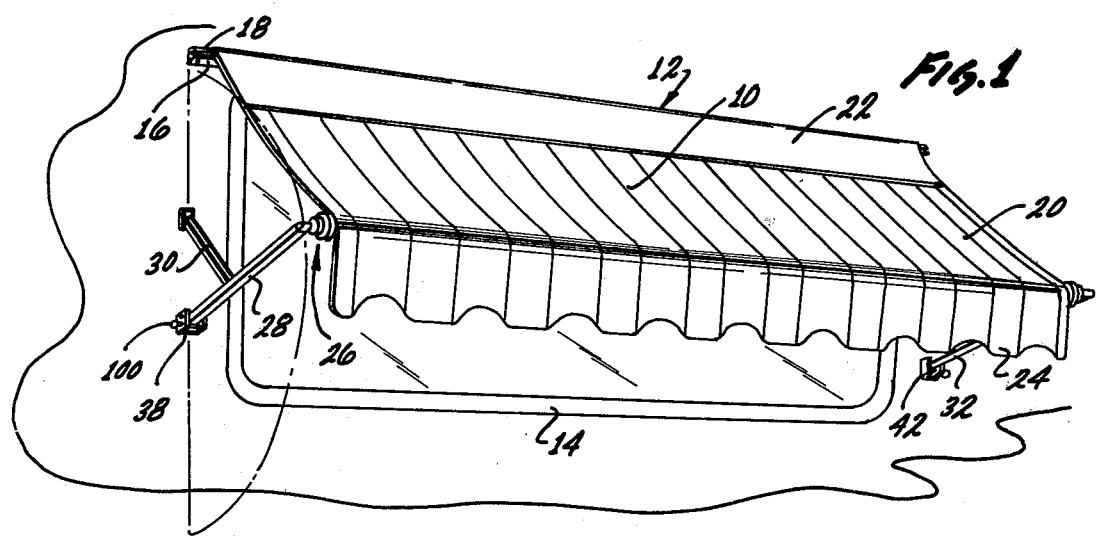

In FIG. 1, a window awning 10 of the present invention is shown attached to the side of a recreational vehicle 12 which vehicle includes a window 14. Attached to the side of the recreational vehicle 12 above the window 14 is a rail 16 which includes a slot 18. The slot 18 receives an end of the window awning fabric which includes a bead (not shown) so as to attach the upper end of the window awning to the side of the recreational vehicle 12 above the window 14.

The window awning 10 includes a main fabric portion 20 which has at its upper end a heavy duty fabric portion 22. The heavy duty fabric portion 22 serves to cover the window awning when the window awning is fully rolled up to be in the closed position. A valance 24 is attached at an intermediate position along the length of the main fabric portion 20 and in the normal position, as shown in FIG. 1, the valance 24 hangs down to provide for additional shielding of the window from the sun and also to give the awning a more finished look.

The awning 10 has the fabric 20 supported on and rolled around a roll-up tension mechanism 26. The ends of the roll-up tension mechanism 26 are supported by support arm assemblies including support arms 28 and 30 on the left side and by support arms 32 and 34 on the right side. Support arm 34 may be more clearly seen in other figures such as FIGS. 3 and 6. First ends of the support arms are attached to the side of the recreational vehicle using mounting brackets 38 and 40 for support arms 28 and 30 and mounting brackets 42 and 44 for support arms 32 and 34.

The support arms 30 and 34 are referred to as rafter arms and the support arms 28 and 32 are referred to as the main support arms. Second ends of the rafter arms 30 and 34 are designed to slide within the main support arms 28 and 32 and with the second ends secured in any desired position using lock knobs 46 and 48. The structure of the main support arms and rafter arms and their interrelation are shown in more detail in FIGS. 2 and 3 with FIG. 2 being a front view including broken-away portions of the left support arm assembly and FIG. 3 being a cross-sectional view taken along line 3—3 in FIG. 5 of the right support arm assembly. It is to be appreciated, of course, that the structure for the right and left support arm assemblies are essentially identical and a description of one will serve as a description of the other.

The main support arms 28 and 32 are formed as U-shaped channel members. One end of each main support arm is coupled to and pivoted for rotation about the mounting bracket such as either bracket 38 or 42. Specifically, the support arms 28 and 32 are coupled to the brackets 38 and 42 using pairs of rivets 50 and 52. The rivets serve as axles to allow for the free rotation of the main support arms around the rivets. The extreme positions for the support arms are as shown by the closed position of FIG. 5 and the storm position in FIG. 8. The roll-up tension mechanism 26 which supports the fabric is attached to the other end of the main support arms 28 and 32.

Figure 4:
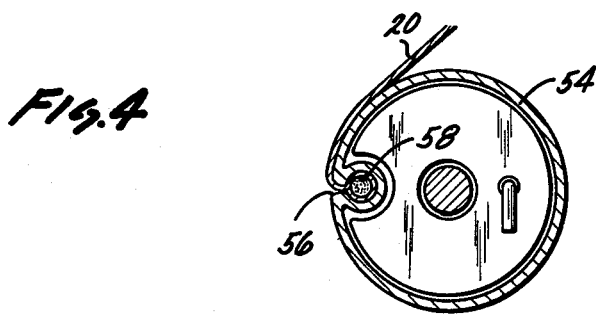
FIG. 4 is a cross-sectional view of the roll-up torsion mechanism taken along lines 4—4 of FIG. 1.

As shown in FIG. 2, each roll-up tension mechanism includes an outer tubular member 54 which supports the awning fabric. As shown in FIG. 4, the outer tubular member 54 includes a groove 56 which extends along the length of the tubular member. The fabric is attached to the tubular member 54 through the use of a bead at the end of the fabric opposite the end attached to the rail 16. This is shown in FIG. 4 where bead 58 at the end of the awning fabric 20 is positioned within the groove 56. The other end of the fabric has a similar bead (not shown) to fit within a similar groove 18 in rail 16.

The roll-up tension mechanism includes two (2) separate tension mechanisms which are located at each end of the roller tube 54 and which are substantially identical. Specifically, as shown in FIG. 2, the left hand roll-up tension mechanism includes a torsion rod 60 which extends outward past the end of the roller tube 54 and with the torsion rod supported for rotation within the roller tube 54. Specifically, a torsion rod stabilizer 62 is positioned within the roller tube 54 and with the stabilizer 62 having a configuration to fit around the groove 20 to thereby prevent the stabilizer from rotating within the tube 54. An end cap 64 caps the end of the roller tube 54 and the end cap 64 is attached to the roller tube 54 using rivets 66. A pair of washers 68 allow for free rotation of the torsion rod 60 within the tube 54 and with the torsion rod stabilizer 62 and the end cap 64 providing for bearing surfaces.

A torsion spring 70 formed as a helix surrounds the torsion rod 60 and with one end of the torsion spring passing through an opening in the torsion rod stabilizer 62 to lock the end of the spring. The other end of the torsion spring 70 is attached by a bolt member to the torsion rod 60. As the roller tube rotates and the fabric is being unrolled, this provides for the torsion spring 70 maintaining tension in the fabric 20 for the various positions of the window awning.

The outside extension of the torsion rod 60 passes through a cradle member 72 and with a pin 74 passing through the cradle member and the torsion rod 60 to lock the end of the torsion rod to the cradle member. As shown in FIG. 3, the right hand support section also includes a cradle member 76 which receives an extension of the right hand torsion rod 78 and with a pin 80 locking the rod and cradle together. The cradle members 72 and 78 fit within the open ends of the main support arms 28 and 32. As shown in FIG. 2, the screw member 82 is used to lock the cradle member at the end of support arm 28. A similar screw member is used to lock cradle member 76 at the end of support arm 32.

Rafter arm 30 is pivoted within mounting bracket 40 using a rivet member 84 and similarly rafter arm 34 is pivoted within mounting bracket 44 using a rivet member 86. The other ends of the rafter arms 30 and 32 are pivoted to slide members 88 and 90 which slide within and are captured by the U-shaped main support arms 28 and 32. Rivet members 92 and 94 intercouple the ends of the rafter arms 30 and 34 to the slide members 88 and 90 and provide for a free pivoting of the rafter arms around the slide members.

The slide members 88 and 90 each include nut inserts 96 and 98 and with the ends of the knobs 46 and 48 formed as screw portions to screw into the nut inserts 96 and 98. When the knobs 46 and 48 are tightened, the screw portions pass through the nut inserts and engage wall portions of the support arms 28 and 32 so as to lock the slides 88 and 90 in desired positions within the support arms 28 and 32. It can be seen that the support arms 28 and 32, as indicated above, are formed as U-shaped members and also include a lip portion extending inward at the tops of the U's so that the slide members 88 and 90 are completely captured within the support arms 28 and 32.

Figure 5:
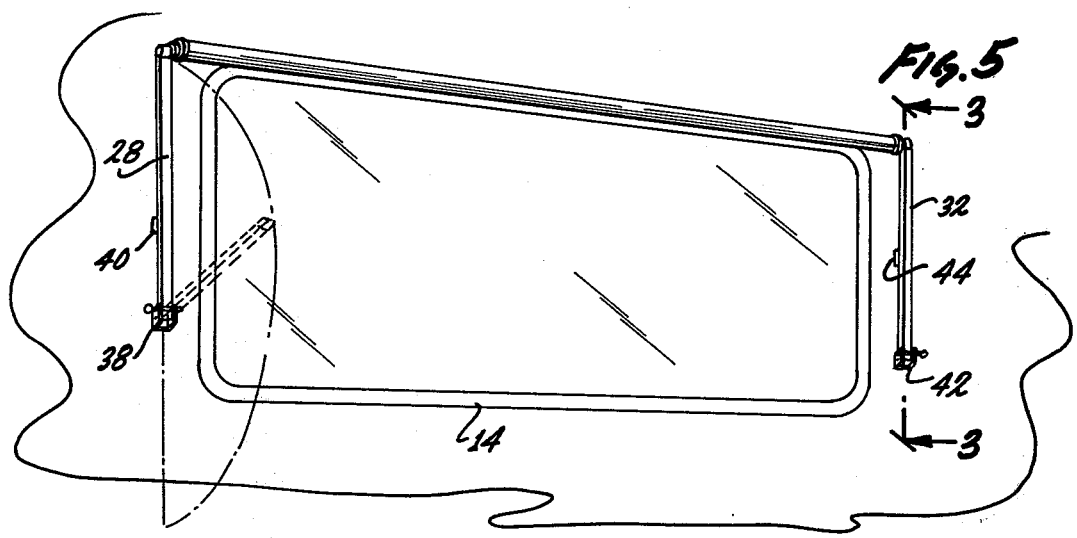
FIG. 5 illustrates the window awning of the present invention in the closed or travel position.
Figure 6:
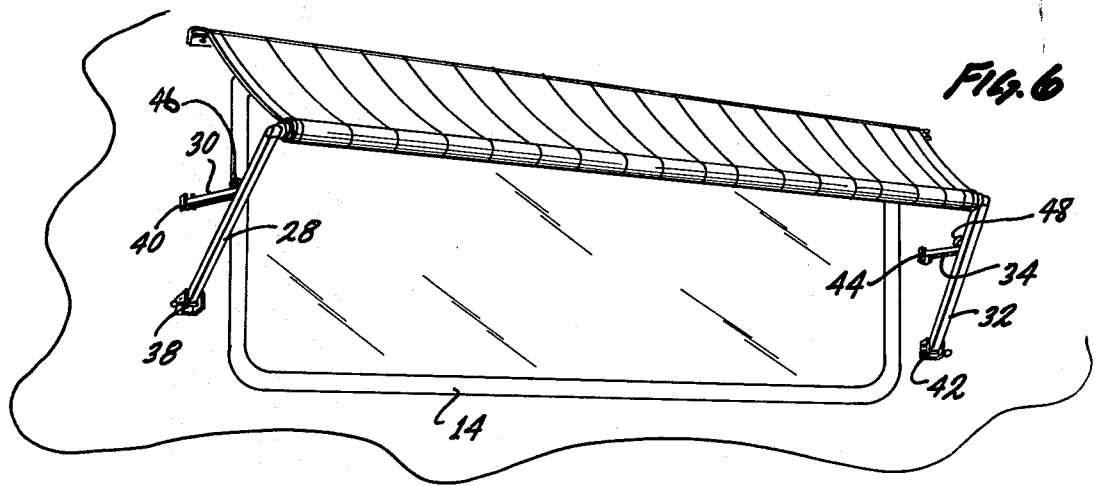
FIG. 6 illustrates the window awning in a partially opened position.

As shown in FIG. 5, the window awning is in a completely closed or travel position wherein the support arm assemblies are flat against the side of the recreational vehicle 12 and with the awning fabric 20 completely rolled around the roller tube 54 to have the heavy fabric portion 22 serving as the cover for the window awning. FIG. 6 illustrates the window awning in a partially opened position which may be used when the sun is high. In this position, the awning fabric 20 has only been unrolled a small amount and the valance section 24 is not yet exposed. When the window awning is pulled to any desired position, the knobs 46 and 48 are tightened down to lock the window awning in this desired position.

Figure 7:
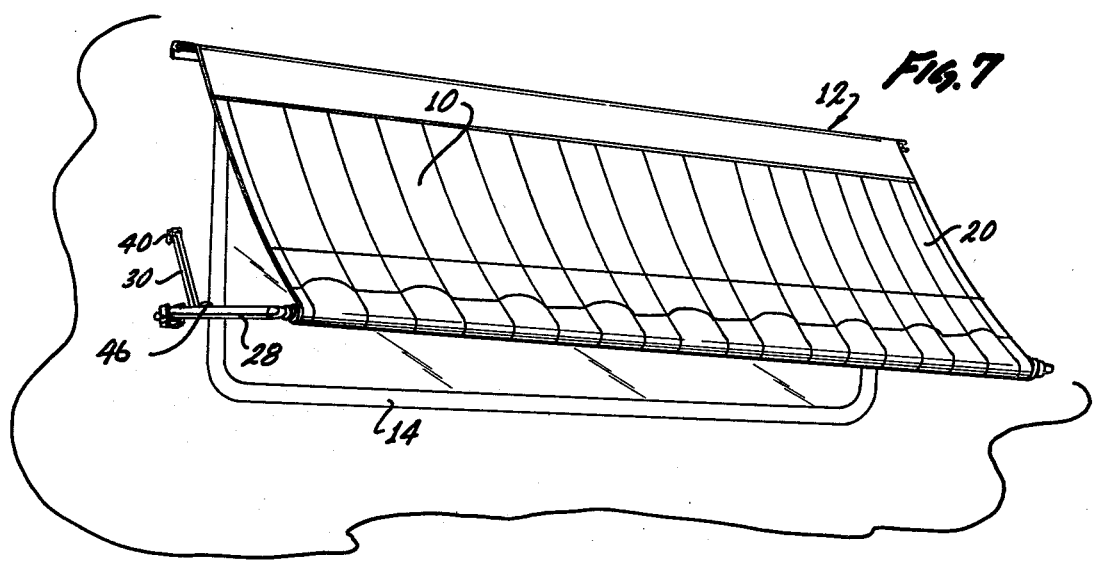
FIG. 7 illustrates the window awning in an extra low position.

FIG. 1 illustrates the window awning pulled down to a normal position where the valance 24 is exposed and falls down to provide its maximum effect. Again, of course, the knobs 46 and 48 are tightened to lock the window awning into the desired position. FIG. 7 illustrates the window awning in an extra low position which may be used when the sun is at a low point in the sky. Again, the knobs 46 and 48 may be tightened to lock the window awning in the desired position and specifically to lock the slides 88 and 90 within the support arms 28 and 32 in the desired position.

Figure 8:
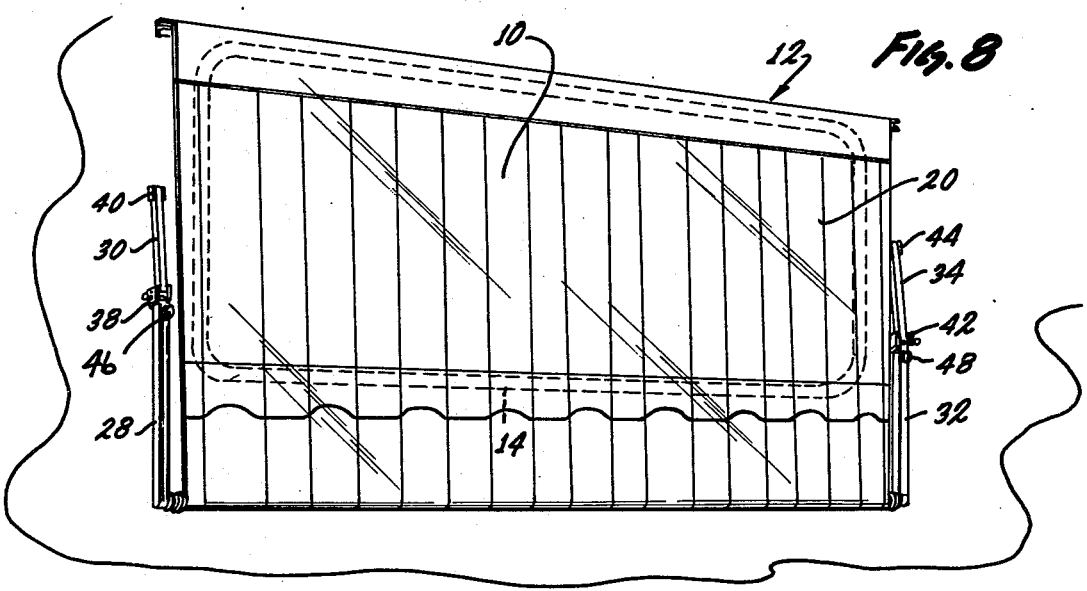
FIG. 8 illustrates the window awning in the storm position.

FIG. 8 illustrates the window awning in a storm position where the window awning lies across the window 14 and with the support arm assemblies lying flush against the side of the recreational vehicle 12 and with the support arm assemblies extending in the opposite direction to that shown in FIG. 5. It can be seen that the slide members 88 and 90 as they slide from the position shown in FIG. 5 to that shown in FIG. 8 provides for an infinite number of positions for the window awning and with the lock knobs 46 and 48 allowing for the locking of the window awning in any desired position.

The relationship between the distances for the mounting points of the rafter arm and the main support arms and the length of the rafter arm relative to this mounting position, provides for the extreme positions which are possible with the window awning of the present invention. Specifically, the mounting brackets 40 and 44 are located less than one-half of the distance between the mounting brackets 38 and 42 and the rail 16. In addition, the length of the rafter arms 30 and 34 are more than the distance between the mounting brackets 40 and 38 and the mounting brackets 44 and 42. However, the length of the rafter arms 30 and 34 must be less than the distance between the mounting brackets 40 and 44 and the top rail 16. This combination of dimensions therefore allows for the window awning to have the extreme positions shown in FIGS. 5 and 8. This is because in the position shown in FIG. 5, the length of the rafter arms is less than the distance between the mountings for the rafter arms and the top rail so that the rafter arms can lie flat against the side of the recreational vehicle and also allow the main support arms to lie flat against the side of the recreational vehicle. Similarly, in the position shown in FIG. 8, the rafter arms are longer than the distance between the mountings for the rafter arms and the mountings for the main support arms so, again, the rafter arms can lie flat against the side of the recreational vehicle and also allow the main support arms to lie against the side of the recreational vehicle.

The window awning of the present invention includes a further means of providing a safety lock of the window awning in position and particularly in the closed or travel position shown in FIG. 5 or in the storm position shown in FIG. 8. This safety lock is provided for by the use of lock pins 100 and 102 which may pass through openings in the mounting brackets 38 and 42. The openings are provided at both a top position 104 and a bottom position 106 for the mounting bracket 38, and a top position 108 and a bottom position 110 for the mounting bracket 42.

For example, when the window awning is in the closed or travel position shown in FIG. 5, the lock pins 100 and 102 are placed in the top positions 104 and 108 so that even if the lock knobs work loose, the pins will lock the support arm assemblies in position. When the window awning is in the storm position shown in FIG. 8, the lock pins 100 and 102 would be positioned through the openings 106 and 110 forming the bottom position to lock the support arm assembly in the storm position shown in FIG. 8.

In the partially open position shown in FIG. 6, the lock pins would pass through the bottom openings and if the lock knobs would become loose the pins would still prevent the window awning from opening past the pin position. Similarly, in the normal position shown in FIG. 1, the lock pins would be placed in the bottom position. In the extra low position shown in FIG. 7, the lock pins would be placed in the upper pin position which would prevent the window awning from closing past the pin position.

It can be seen, therefore, that the present invention is directed to a window awning which has a support arm structure which is more solid than present window awnings and therefore makes it less likely that the awning will pull away from the recreational vehicle. In addition to the awning being sturdy, it is also energy conserving since the window awning can be extended to an infinite number of positions so as to block harsh sun rays and thereby keep the recreational vehicle cooler. The awning can even be lowered completely to a storm position to provide for complete privacy and also for protection in severe weather conditions. The storm position will also help in energy conservation since it provides a layer of insulation to keep the vehicle warmer on the inside even on cold nights. The awning also includes a valance which in the normal position provides for more shade and also gives the awning a more finished look. Even though the awning can be adjusted to an infinite number of positions by using lock knobs, the awning also includes safety pins which provide an added safety lock for the closed position or for the storm position of the window awning.

The present invention has been described wherein the support arm assemblies are shown to have the mounting brackets for the rafter arms positioned intermediate the mounting brackets for the main support arms and the top rail. It is to be appreciated that the mounting brackets for the rafter arms may be positioned below the mounting brackets for the main support arms. In such an alternative structure, the support arm assemblies for the window awning in the closed position will appear similar to that shown in FIG. 8 but with the arms extending upward. Similarly, in such an alternative structure, the support arm assemblies for the window awning in the storm position will appear similar to that shown in FIG. 5 but with the arms extending downward. Generally, for the window awning to have the extreme positions described in this specification, the mounting bracket for the rafter arm is positioned from the mounting bracket for the main support arm a first dimension equal to less than one-half the distance between the mounting bracket for the main support arm and the top rail and with the length of the rafter arm greater than the first dimension but less than a second dimension equal to the length of the main support arm minus the first dimension.

Although the invention has been described with reference to particular embodiments, it is to be appreciated that various adaptations and modifications may be made and the invention is only to be limited by the appended claims.

I claim:

1. An awning for a window, including, a roll-up mechanism including a roller tube and an awning fabric, one end of the awning fabric being attached to the roller tube and then wound around the tube, the roll-up mechanism being constructed to provide tension in the awning fabric as the fabric is unrolled from the roller tube, means for attaching the other end of the awning fabric above the window, a pair of support arm assemblies each extending from an individual side of the window and coupled to an opposite end of the roll-up mechanism, each assembly including, a main support arm extending at one end from the side of the window and coupled at the other end to one end of the roll-up mechanism and rotatable through an angle of approximately 180° about the side of the window as a fulcrum, a rafter arm extending at one end from the side of the window and rotatable through an angle of approximately 180° about the side of the window as a fulcrum and coupled at the other end to an associated one of the main support arms for sliding movement along the associated main support arm, during its rotation through an angle of approximately 180°, to a plurality of positions for providing different awning positions, and means for locking the other end of the rafter arm to the main support arm at the individual ones of the different awning positions.

2. The window awning of claim 1 wherein the other end of the rafter arm is in sliding engagement with the main support arm for providing an infinite number of awning positions and wherein the means for locking provides for locking at any awning position.

3. The window awning of claim 2 wherein the sliding engagement is provided by a slide member captured by the main support arm and attached to the other end of the rafter arm and wherein the means for locking provides for locking the slide member in position.

4. The window awning of claim 3 wherein the means for locking includes a lock knob including a bolt portion threaded through the slide member to contact the main support arm.

5. The window awning of claim 1 wherein a first distance between the attachment of the rafter arm to the window and the attachment of the main support arm to the window is less than one-half a second distance between the attachment of the main support arm to the window and the attachment of the awning fabric to the window and wherein the length of the rafter arm is greater than the first distance but less than the difference between the length of the main support arm and the first distance.

6. The window awning of claim 5 wherein the attachment of the rafter arm to the window is intermediate the attachment of the main support arm to the window and the attachment of the awning fabric to the window.

7. The window awning of claim 5 wherein the main support arms and the rafter arms are constructed and attached to the window to provide for extremes of the awning positions between a closed position with the awning fabric completely rolled up and a fully open position with the awning fabric flat against and covering the window.

8. The window awning of claim 7 additionally including a lock pin for locking the awning in the extreme positions.

9. The window awning of claim 1 wherein the awning fabric includes a valance portion for hanging from the awning in a partially open position.

10. The support arm assembly of claim 1 wherein the other end of the rafter arm is in slidable engagement with the main support arm for providing an infinite number of awning positions and wherein the means for locking provides for locking at each individual awning position.

11. The support arm assembly of claim 10 wherein the slidable engagement is provided by a slide member captured by the main support arm and attached to the other end of the rafter arm and wherein the means for locking provides for locking the slide member in position.

12. The support arm assembly of claim 11 wherein the means for locking includes a lock knob including a bolt portion threaded through the slide member to contact the main support arm.

13. A support arm assembly for an awning of the window of the type wherein an awning fabric has one end attached to and wound around a roller tube portion of a roll-up mechanism and the other end of the awning fabric attached above the window and wherein support arm assemblies extend from the sides of the window and are attached to opposite ends of the roll-up mechanism, each support arm assembly including a first mounting bracket attached to the window,
a main support arm extending at one end from and rotatable about the first mounting bracket between an upward position abutting the window and a downward position abutting the window and constructed for coupling at the other end to the roll-up mechanism,
a second mounting bracket attached to the window,
a rafter arm extending at one end from and rotatable about the second mounting bracket between an upward position abutting the window and a downward position abutting the window and adjustably coupled at the other end to the main support arm in a plurality of different positions relative to the main support arm,
means for locking the other end of the rafter arm to the main support or each individual one of the different coupled positions, and
the support arm assemblies being constructed to provide for the support of the window awning at each individual one of the plurality of awning positions between the extreme positions.

14. The support arm assembly of claim 13 wherein a first distance between the attachment of the second mounting bracket and the one end of the rafter arm and the attachment point of the first mounting bracket and the one end of the main support arm is less than one-half of a second distance between the attachment of the first mounting bracket and the one end of the main support arm and the attachment of the other end of the awning fabric and the window and the length of the rafter arm is greater than the first distance but less than the difference between the length of the main support arm and the first distance.

15. The support arm assembly of claim 14 wherein the attachment of the mounting bracket and the one end of the rafter arm is intermediate the attachment of the mounting bracket and the one end of the main support arm and the attachment of the other end of the awning fabric to the window.

16. The support arm assembly of claim 14 wherein the extremes of the positions of the rafter arm and the main support arm include a closed position with the awning fabric completely rolled up above the window and a fully open position with the awning fabric flat against and covering the window.

17. The support arm assembly of claim 16 additionally including a lock pin for locking the rafter arm and the main support arm in the extreme positions.

18. The support arm assembly of claim 17 wherein the first mounting bracket includes openings to receive the lock pin.

19. The support arm assembly of claim 18 wherein openings are provided at different positions in the first mounting bracket to receive the lock pin at different positions to lock the rafter arm and the main support arm in extreme positions.

* * * * *